United States Patent
Lata Pérez

(10) Patent No.: US 8,567,970 B2
(45) Date of Patent: Oct. 29, 2013

(54) HELIOSTAT SUPPORT FACET

(75) Inventor: Jesús María Lata Pérez, Bilbao (ES)

(73) Assignee: Sener, Ingenieria Y Sistemas, S.A., Las Arenas, Vizcaya (ES)

( * ) Notice: Subject to any disclaimer, the term of this patent is extended or adjusted under 35 U.S.C. 154(b) by 454 days.

(21) Appl. No.: 12/760,260

(22) Filed: Apr. 14, 2010

(65) Prior Publication Data

US 2010/0265602 A1    Oct. 21, 2010

(30) Foreign Application Priority Data

Apr. 17, 2009   (ES) .................................. 200901011

(51) Int. Cl.
*G02B 7/182*   (2006.01)
*G02B 5/10*    (2006.01)

(52) U.S. Cl.
USPC ......................................... 359/871; 359/853

(58) Field of Classification Search
USPC ............................. 359/853; 353/3
See application file for complete search history.

(56) References Cited

U.S. PATENT DOCUMENTS

| | | | | | |
|---|---|---|---|---|---|
| 4,209,236 | A | * | 6/1980 | Horton et al. | 353/3 |
| 4,358,183 | A | * | 11/1982 | Whiteford | 359/847 |
| 4,709,241 | A | * | 11/1987 | Cusson | 343/916 |

* cited by examiner

*Primary Examiner* — Jade R Chwasz
(74) *Attorney, Agent, or Firm* — Merchant & Gould P.C.

(57) ABSTRACT

Heliostat facet configured from a flat structure comprising a central section (1) and a peripheral section (2) comprising first (3) and second sides (4), being both sections linked together by a plurality of arms (5, 6), which starting from the central section (1) radially run towards the peripheral section (2) taking as reference the geometrical center (7) of the facet. In at least three of the arms (5, 6), there are support points (15) of the facet in the corresponding heliostat support (16). The arms (5,6) comprise first arms (5) which are arranged from the central section (1) to the peripheral section (2) running in a divergent manner and at least two couples of second arms (6) which starting from the central section (1) run to the peripheral section (2), the arms (6) of each couple radially running in a convergent manner.

12 Claims, 4 Drawing Sheets

HELIOSTAT SUPPORT FACET

This application claims benefit of Ser. No. 200901011, filed 17 Apr. 2009 in Spain and which application is incorporated herein by reference. To the extent appropriate, a claim of priority is made to the above disclosed application.

FIELD AND OBJECT OF THE INVENTION

The invention refers to the field of renewable energies and more specifically to a facet serving as supporting structure of a reflective body or sheet in a heliostat.

BACKGROUND

Nowadays there are known different devices and systems to support a reflective body or sheet, such as mirrors, mounted on heliostats used for harnessing solar energy.

In most cases, the supporting structure of the reflective body or sheet consists of a metallic frame or structure constituted by a plurality of metallic profiles of different sections which are joined together by welding or by removable elements such as screws and nuts to determine said frame, which usually has an essentially rectangular shape. Later, the reflective body is joined to the aforementioned frame usually by means of adhesives.

The aforementioned frames usually have a series of disadvantages among which we can mention the following ones:

Generally they are very heavy-weight structures due to the metallic nature of the profiles so that their mounting is difficult when the reflective surface to be installed is large. Said great weight also complicates and hardens the supporting structure of the facets and worsens its deformations vis-à-vis the heliostat service loads and thus its optical performance.

The union points, be them welding or screws, are usually prone to deteriorations by external meteorological agents such as rain and drastic temperature changes, which can cause the frame to break at said points.

Besides, as the profiles are joined together, there can be small displacements between them once the reflective body has been attached and said displacements can cause deformations on said bodies worsening their optical performance, and even leading to the partial loosening of said bodies from the frame itself.

It is also difficult to attain high repetitiveness in the dimensional quality in this type of welded or mechanically joined structures as a result of the deformations caused by the welding process or mechanical unions which results in a worse optical performance of the reflective surface they support.

Consequently, manufacturing and mounting costs are high for the manufacturing of large series of facets based on this concept as a result of their manufacturing and mounting process, conceptually manual and therefore hardly automatable.

Due to all of this, it has been detected a need to provide a supporting structure, particularly a flat facet which as far as possible attempts to solve the problems described.

This objective is attained by the invention as defined in claim 1, in the dependent claims preferred embodiments of the invention are defined.

SUMMARY

The present invention refers to a heliostat facet configured from a flat structure comprising a plurality of formings distributed on its surface. The facet is characterized in that it comprises a central section and a peripheral section comprising first and second sides, both sections being linked together by a plurality of arms, which starting from the central section radially run towards the peripheral section taking as reference the geometrical centre of the facet. Additionally, in at least three of the arms, there are support points of the facet in the corresponding heliostat support.

The arms can comprise first arms which are arranged from the central section to the peripheral section running in a divergent manner and at least two couples of second arms which starting from the central section run to the peripheral section, the arms of each couple radially running, taking as reference the geometrical centre of the facet.

The correct rigidity is attained in this manner for the dimensional stability of the reflective surface offering support and a good distribution of the loads to which the facet is subjected, going from its support points in the heliostat support to the periphery of the facet thanks to the geometrical disposition of the aforementioned first and second arms.

In an aspect of the invention, the facet will have the possibility of comprising a total of six first arms, four of which intersect the peripheral section vertexes and the two others intersecting the intermediate points of the first sides of the peripheral section and two couples of second arms intersecting the arms of each couple with intermediate points of each one of the second sides of the peripheral section.

In another aspect of the invention, the central section, the peripheral section and the arms could be sunken with respect to the support plane of a reflective body on the facet, so that all of them can have a basically U-shaped transverse section, which side branches are inclined in a divergent way with respect to the central branch.

In the areas delimited by the central section, the peripheral section and the arms, it will be possible to remove the material corresponding to said areas of the flat structure determining a plurality of hollows, the central section having a curved hollow centred with respect to the geometrical centre of the facet.

Next to the side branches constituting the U-shaped section of the central and peripheral sections and arms and delimiting the outline of the holes there will be sections extending from said branches forming an angle with the branches arranged in a parallel manner to the central branch, being the width of the sections smaller than that of the branches and said sections being configured to determine the support plane of the reflective body which is joined to the facet through adhesive. In this way, it is attained to secure the adhesive of the reflective body to the facet.

Additionally, the peripheral section will have its rounded vertexes and a continuous external flange which will cover its entire perimeter and which will extend in a direction opposite the support plane of the reflective body. The function of said flange is to increase the perimeter rigidity of the facet assembly.

In another aspect of the invention, the facet may have, in at least three of the first and/or second arms, concretely in the central branch of its section, support points of the facet in the corresponding support of the heliostat, being said points located in an intermediate point of the width of the aforementioned central branch. In this way, with the minimum number of support points arranged in the facet it is attained the secure support of the reflective body, and the curvature thereof is maintained and, therefore, the optical quality of said reflective body is not influenced by external meteorological agents.

In each one of the support points there could be through orifices for the connection of the facet with the heliostat support, being it possible to make a plurality of deep drawings around each one of the holes. Said deep drawings will harden the area surrounding the aforementioned holes for a better effort transmission from said holes towards the rest of the area, arms, central or peripheral section, where said holes have been made.

Optionally, in each one of the arms, in the central branch of their U-shaped transverse section, there can be at least one through orifice for water discharge. Through said holes both rain water and water from humidity condensation can be discharged to prevent said humidity from damaging the stamping, the reflective body or the facet adhesive union.

In another aspect of the invention, in the convergence area of the central section with the first arms connecting with the intermediate points of the first sides of the peripheral section there can be longitudinal deep drawings starting from the inner limit of the central section which will extend beyond the exterior limit of said central section, covering a small section of the end of the corresponding arm. The main mission of said deep drawings is to make the area in which they are located more rigid, and therefore, improve the transmission of tensions transmitted from the central area to the peripheral area through the facet arms.

Finally, the central section can have a rounded shape comprising a plurality of curved sections and the peripheral section can have an essentially rectangular shape, these forms being in no case limiting, being possible for said portions to have other geometrical shapes complying with the loads required in the heliostat in each case. With the present invention, the following advantages can be attained:

The formings of the sheet, even if this is very thin, less than 1 mm, with the following weight and cost advantages, allow enough rigidity for the reflective surface they support to attain the necessary optical performance.

Greater surface quality of the reflective surface and repetitiveness in large series. Unlike facets with welded structure, this facet based on formed sheet, manufactured for example through a stamping process, is obtained by an automated assembly line mass producing them, and its supporting structure is a sheet manufactured using a press machine with the procedures and quality used in the automotive industry, which secures excellent repetitiveness and precision. It neither has any deformations associated to the welding which appear in those with welded structure which besides cannot guarantee the same dimensional stability and repetitiveness, since they stem from a more manual process which cannot guarantee such high tolerances.

Greater production cycle as a result of an automated concept, not only in the manufacturing of the formed sheet but also in the adhesive process, on a more accurate and controlled contact surface.

Due to its geometry, it also allows a larger contact surface with the reflective surface and therefore, better attachment thereof. This fact makes it appropriate to use thinner reflective surfaces, thus improving the optical quality, weight and cost thereof.

Capacity to give certain curvature desired in facets based on flat reflective surfaces in order to improve their optical quality. In the case of the facet of the present invention, it is possible to provide the desired curvature in the adhesive process starting from a flat reflective surface as well as from a flat formed sheet in its interface therewith, thanks to the flexibility of the formed sheet and its adaptability to different shapes or curvatures before its union with the reflective surface and forming with it a sandwich with enough rigidity once they are joined together; this is not possible in the case of a facet with welded structure. The key is that in the facet based on welded structure the concept is that it is a very rigid self-supporting structure to which a very flexible reflective structure is joined by itself which is not at all self-supporting, while in the case of the facet based on a formed structure the two parts are each quite flexible and they can be adapted to a predefined geometry that they maintain after being joined, normally through adhesive, to form a rigid structure. In order to provide certain curvature in a facet with a welded structure, a complex adhesive process would be required which will generate a thickness variation of the adhesive between the reflective surface with the desired curvature and the flat metallic structure, which would be hard to industrialize and it would not be possible to guarantee an acceptable quality.

As a result, a lighter facet is obtained, with the advantages this entails with respect to the heliostat structure which has to support them.

As a result, manufacturing and mounting costs are reduced due to the aforementioned automation concepts that this facet entails.

BRIEF DESCRIPTION OF THE DRAWINGS

The following is a brief description of a series of drawings which will help understand the invention better relating to some embodiments of said invention which are presented as non-limiting examples thereof.

FIG. 3b represents a sectional view according to the transverse perpendicular cutting plan F-F of FIG. 3a.

DETAILED DESCRIPTION

Figure 1:
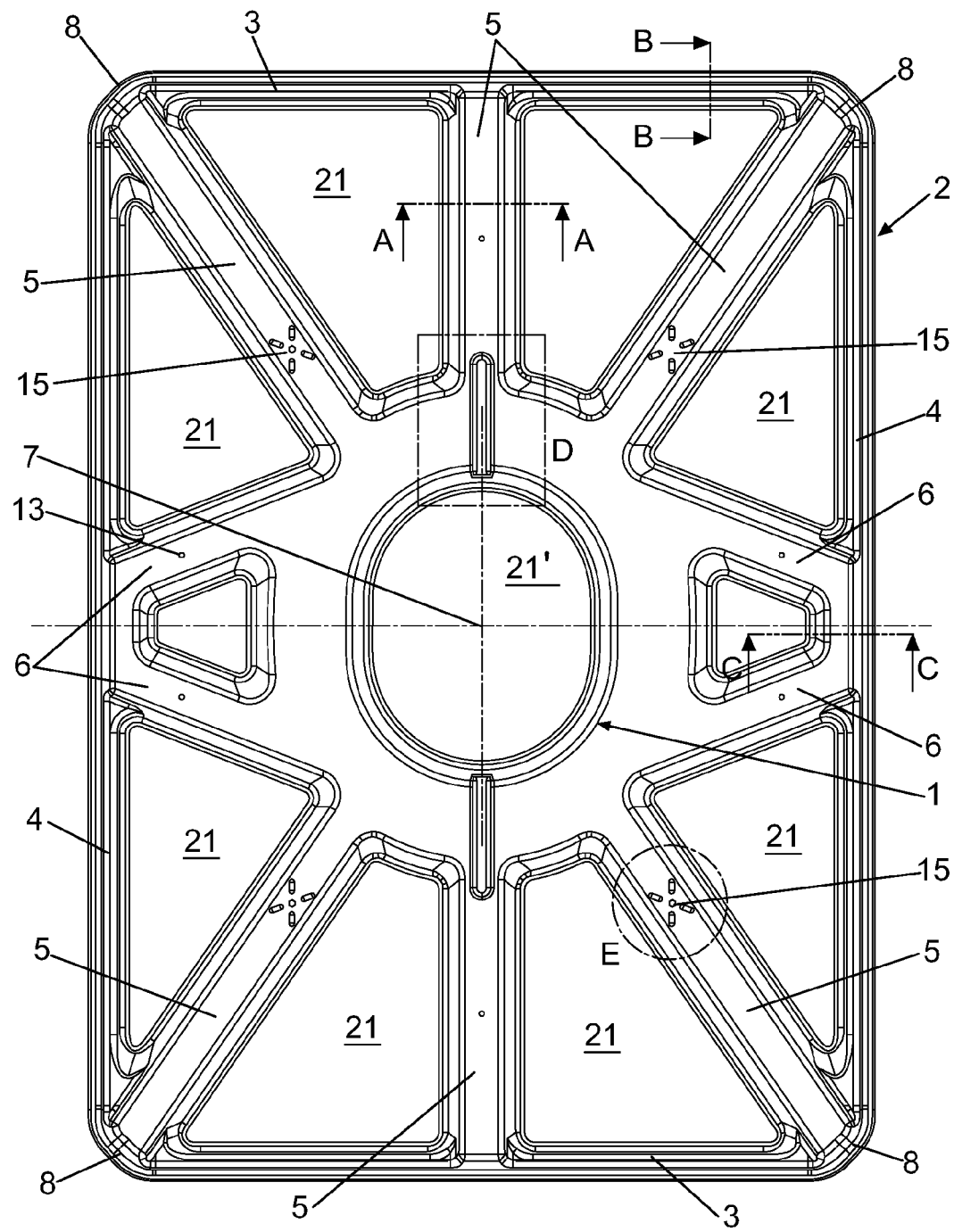
FIG. 1 represents a plan view of the facet object of the present invention.

As it can be seen in the drawings, the heliostat facet object of the present invention is constituted from a sheet in which, by means of stamping, a plurality of formings have been made distributed along the entire surface of the facet.

More particularly in FIG. 1, it can be seen how the facet has a central section (1) and a peripheral section (2) having first (3) and second sides (4), both sections being linked by arms which comprise first arms (5) from the central section (1) to the peripheral section running in a divergent manner, and at least two couples of second arms (6) starting from the central section (1) running to the peripheral section (2), the arms (6) of each couple running in a radially convergent manner using as reference the geometrical centre (7) of the facet. In the present embodiment of the invention there are a total of six first arms (5), four of which intersect the vertexes (8) of the peripheral section (2) and the other two of which intersect the intermediate points of the first sides (3) of the peripheral section (2) and two couples of second arms (6) intersecting the arms of each couple with intermediate points of each one of the second sides (4) of the peripheral section (2). Said particular distribution has been obtained as a result of a structural design thereof taking into account the requirements to which a facet used in a heliostat is submitted, being said arm distribution in no case limiting, rather guiding, being possible to obtain alternative geometrical distributions which adapt to the load conditions in each particular case.

Normally, the condition that the central section (1), the peripheral section (2) and the arms (5) and (6) must fulfill is that both sections be connected to each other through a plurality of arms (5) and (6), which starting from the central section (1) run towards the peripheral section (2) in a radial way taking as reference the geometrical centre (7) of the facet.

Figure 2A:
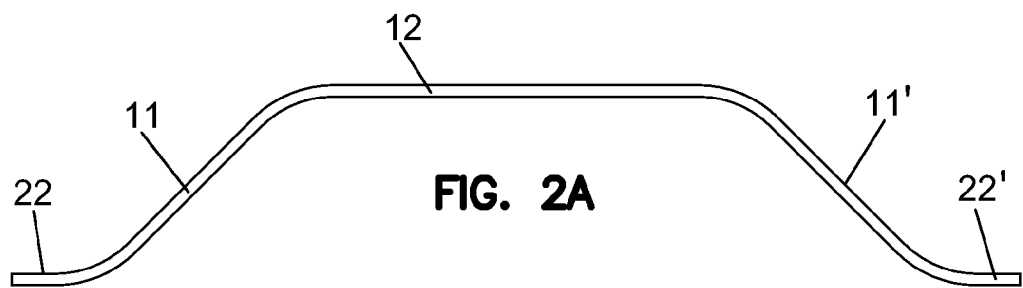
FIG. 2a represents a partial transverse sectional view of the facet according to the cutting plane A-A of FIG. 1, in which the shape of the section of one of the facet arms can be seen.
Figure 2B:
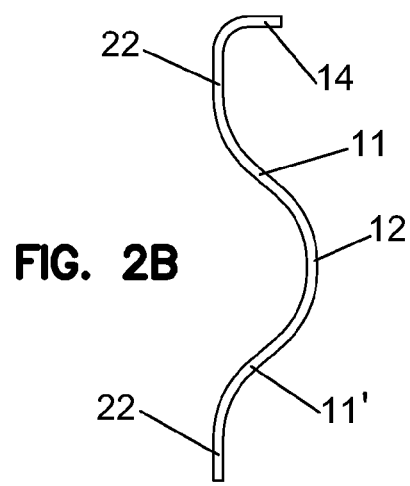
FIG. 2b represents a partial transverse sectional view of the facet according to the cutting plane B-B of FIG. 1, in which the shape of the section of the peripheral section of the facet can be seen.
Figure 2C:
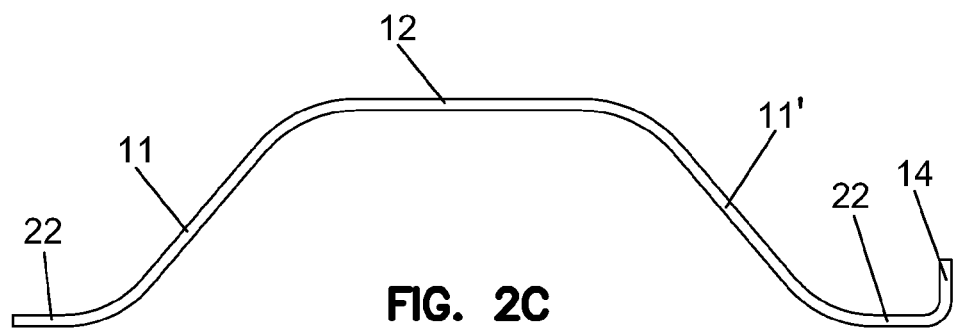
FIG. 2c represents a partial transverse sectional view of the facet according to the cutting plane C-C of FIG. 1.

The central section (1), the peripheral section (2) and the arms (5) and (6), through the stamping using a press, are sunken with respect to the support plane (9) of a reflective body (10) on the facet, thus obtaining transverse sections both of the central section (1), the peripheral section (2) and the arms (5) and (6) of the facet, which have an essentially U-shaped form (FIGS. 2a, 2b and 2c), the side branches of which (11-11') are inclined in a divergent way with respect to the central branch (12). Said shape in the section is logically non-limiting and has been adopted in particular for providing the aforementioned elements with a great rigidity and structural resistance, being it possible to use alternative sections providing the elements with similar rigidity.

An essential characteristic of the invention lies in the fact that at least three of the arms (5, 6) have support points (15) of the facet in the corresponding heliostat support (16), being said support points (15) located in an intermediate point of the width of the aforementioned central branch (12). In this particular embodiment of the invention, see FIG. 1, there exists 4 support points given the general rectangular geometry of the peripheral section, being said support points located in the first arms (6) which we shall call diagonal as they are joined to the central section with the vertexes (8) of the peripheral section (2), since in the arms there are located the optimum support locations which minimize deformations vis-à-vis the service loads of the heliostat, gravity, wind, etc., both of the facet in particular and of the heliostat structure supporting it in general. These areas support the greatest load levels given the way in which the facet geometry is defined.

In this particular embodiment of the facet, in the areas delimited by the central section (1), the peripheral section (2) and the arms (5) and (6), the material corresponding to said areas of the flat structure is removed, determining a plurality of holes (21), the central section (1) having a curved hole (21') centered with respect to the geometrical centre (7) of the facet. Said removal of material is carried out to reduce the weight of the facet maintaining the rigidity thereof, this characteristic not being indispensable, and being possible to leave the material corresponding to the aforementioned holes (21-21') if necessary. Next to the side branches (11-11') constituting the U-shaped section of the central section (1), the peripheral section (2) and the arms (5) and (6) and delimiting the outline of the holes (21-21') there are arranged sheet sections (22) extending from said branches forming such an angle therewith that they are arranged in a parallel way to the central branch (12), being the width of the sections smaller than that of the branches (11-11'). In this way, said sections (22) define the support plane (9) of the reflective body (10) which is joined to the facet, being the union between them carried out through adhesive, normally applying an adhesive on the front face of the aforementioned sections (22). Additionally, the peripheral section (2) has a continuous external flange (14) covering its entire perimeter and extending in a direction opposite to the support plane (9) of the reflective body (10).

Figure 3A:
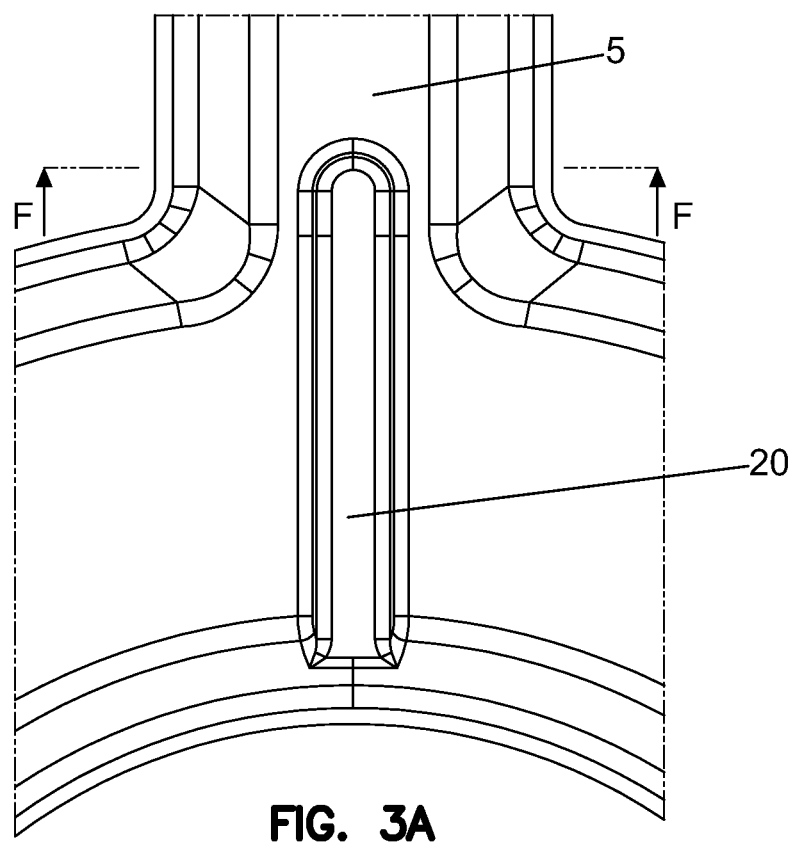
FIG. 3a represents a large-scale detailed view of a section of the facet according to the D line of FIG. 1.
Figure 3B:
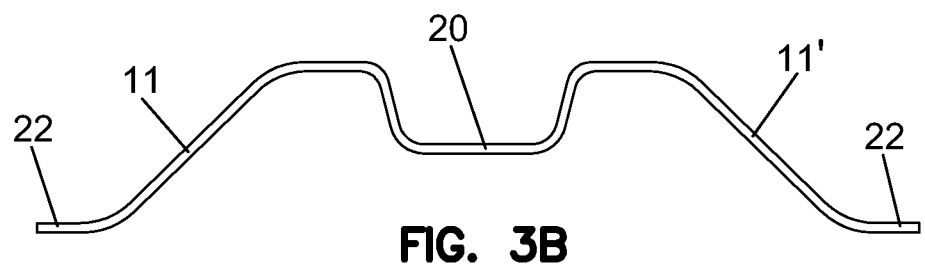
Figure 4:
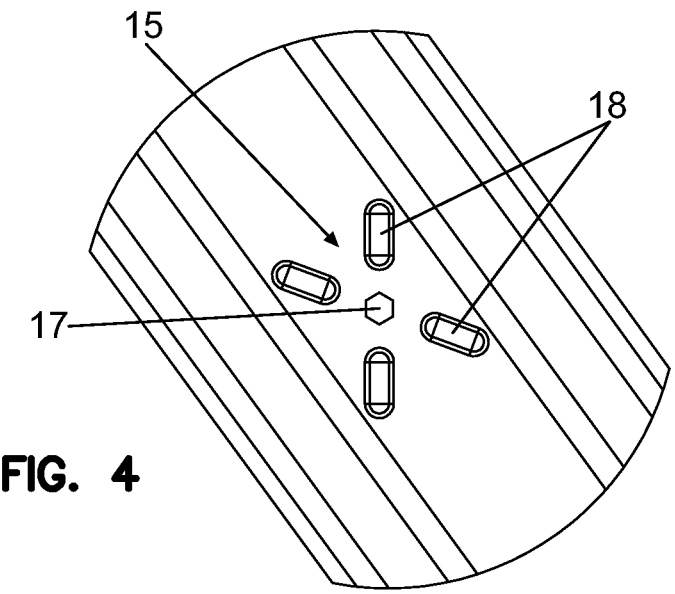
FIG. 4 represents a large-scale detailed view of a section of the facet according to the E line of FIG. 1.

In order to increase the rigidity of the facet, there have been contemplated a series of deep drawings, see FIGS. 3a, 3b and 4, on the one hand, on the support points (15) there are through orifices (17) for connecting the facet to the heliostat support (16), making around each one of the holes (17) a plurality of deep drawings (18). On the other hand, in the area of convergence of the central section (1) with the first arms (6) connecting with the intermediate points of the first sides (3) of the peripheral section (2) there are longitudinal deep drawings (20) which starting from the inner limit of the central section (1) extend beyond the external limit of said central section (1), covering a small section of the end of the corresponding arm (5).

Besides, there are on each one of the arms (5) and (6), in the central branch (12) of its section, at least one through orifice (13) for water discharge.

Finally, given the usual geometry of heliostat facets, it has been decided that in this particular embodiment of the invention, the central section (1) has a rounded shape, formed by a plurality of curved sections, having an approximately oval shape, the central hole (21') being located on the geometrical centre (7) of the facet. As for the peripheral section, it has an essentially rectangular shape with rounded vertexes (8). Therefore, the section has total symmetry with respect to symmetry axes perpendicular to each other which go through the geometrical centre (7) of the facet and which are perpendicular to the first (3) and second (4) sides of the peripheral section (2), respectively.

Figure 5:
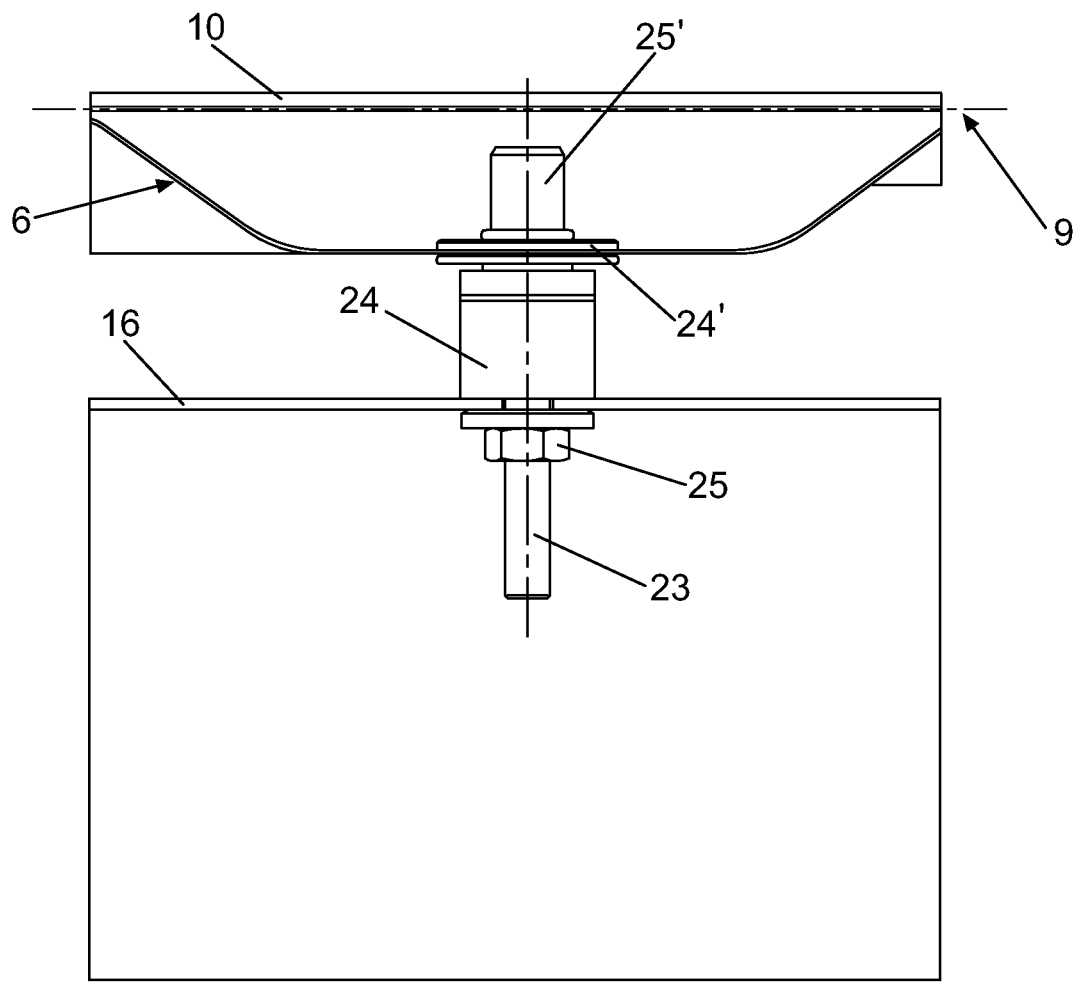
FIG. 5 represents a sectional view of the union area of the facet with the heliostat support through the support points enabled in the facet, as well as its union with the reflective body.

The union of the facet to the heliostat support (16) will be carried out through the support points located on the branches (12) of the arm (6) section, using to that end, as it can be seen in FIG. 5, detachable mechanical connecting means such as a threaded rod (23), washers (24) and (24') and nuts (25) and (25').

The invention claimed is:

1. Heliostat facet configured from a a stamped sheet, for supporting a reflective body, the heliostat facet comprising a plurality of formings distributed on a surface of the facet, which form:
   a central section;
   a peripheral section comprising first and second sides;
   a plurality of arms linking the central section and the peripheral section, which extend radially outward towards the peripheral section from the geometrical center of the facet in the central section; at least three of the arms including support points of the facet in a corresponding heliostat support;
   wherein the central section, the peripheral section and the arms are sunken with respect to a support plane of the reflective body supported on the facet; wherein the central section, the peripheral section and the arms have a substantially U-shaped transverse section having side branches; and
   extension sections proximate to and extending from the side branches of the U-shaped section of the central section, the peripheral section and the arms, the extension sections defining the support plane of the reflective body joined to the extension sections of the facet by adhesive.

2. The facet according to claim 1, wherein the arms comprise first arms which are arranged from the central section to the peripheral section extending in a divergent manner and at least two couples of second arms which start from the central section and extend to the peripheral section, the arms of each couple radially extending taking as reference the geometrical center of the facet.

3. The facet according to claim 1, comprising six first arms, four of which intersect vertexes of the peripheral section and the two others intersect intermediate points of the first sides of the peripheral section and two couples of second arms, wherein the second arms of each couple intersect intermediate points of each one of the second sides of the peripheral section.

4. The facet according to claim 1, wherein the side branches are inclined in a divergent manner with respect to a central branch.

5. The facet according to claim 1, wherein in the areas delimited by the central section, the peripheral section and the arms, material corresponding to areas of a flat structure is removed forming a plurality of hollows, the central section having a curved hollow centered with respect to the geometrical center of the facet, an outline of the hollows delimited by the extension sections.

6. The facet according to claim 1, wherein extension sections extending from said branches are arranged in a parallel manner to the central branch, a width of the extension sections being smaller than a width of the side branches.

7. The facet according to claim 1, wherein the peripheral section has rounded vertexes and a continuous external flange covering an entire perimeter and extending in a direction opposite the support plane of the reflective body.

8. The facet according to claim 1, wherein in at least three of the first and/or second arms, in a central branch of a section are support points of the facet in the corresponding support of the heliostat, said support points being located in an intermediate point of a width of the central branch.

9. The facet according to claim 8, wherein in each one of the support points are through orifices for the connection of the facet with the heliostat support, with a plurality of deep drawings around each one of the orifices.

10. The facet according to claim 1, wherein on each one of the arms and in the central branch of its section, there is at least one through orifice for water discharge.

11. The facet according to claim 1, wherein in an area of convergence of the central section with the first arms connecting with intermediate points of the first sides of the peripheral section are longitudinal deep drawings which starting from the inner limit of the central section extend beyond the external limit of said central section, covering a small section of an end of the corresponding arm.

12. The facet according to claim 1, wherein the central section has a rounded shape, formed by a plurality of curved sections, and wherein the peripheral section has an essentially rectangular shape.

* * * * *